United States Patent [19]

Ghose

[11] Patent Number: 5,694,133

[45] Date of Patent: Dec. 2, 1997

[54] ADAPTIVE DIRECTION FINDING SYSTEM

[76] Inventor: Rabindra N. Ghose, 8167 Mulholland Ter., Los Angeles, Calif. 90046

[21] Appl. No.: 597,499

[22] Filed: Feb. 5, 1996

[51] Int. Cl.$^6$ .................................................. H01Q 3/22
[52] U.S. Cl. .......................... 342/372; 342/381; 342/384; 455/273
[58] Field of Search ................................. 342/372, 381, 342/384; 455/273, 278.1

[56] References Cited

U.S. PATENT DOCUMENTS

| | | | |
|---|---|---|---|
| 3,938,154 | 2/1976 | Lewis | 343/100 LE |
| 4,051,474 | 9/1977 | Mack et al. | 343/100 LE |
| 4,347,627 | 8/1982 | Alter | 455/136 |
| 4,486,757 | 12/1984 | Ghose et al. | 343/417 |
| 4,555,706 | 11/1985 | Haupt | 343/379 |
| 5,296,865 | 3/1994 | Lewis | 342/384 |

Primary Examiner—Thomas H. Tarcza
Assistant Examiner—Dao L. Pham
Attorney, Agent, or Firm—Rabindra N. Ghose Attorney

[57] ABSTRACT

This invention relates to automatic direction finding methods and systems for an electromagnetic or acoustic signal source by utilizing the concept of adaptive nulling of a narrow or wideband signal received by one sensor from the same signal received by the other, along with appropriate adjustments, in a two-sensors-interferometer. Plurality of sensors can be used to measure two orthogonal angles of arrival of a signal. Inventive methods and devices permit singling out a particular signal of interest among others by allowing a frequency tuning and selective amplification of the particular signal of interest without destroying the differential phase or time delay between the signals received by the sensors that determine the angle measurement. A high degree of signal cancellation during the adaptive nulling process permits a correspondingly high degree of accuracy and resolution for the angle measurement and also permits a relatively short baseline for the interferometer.

9 Claims, 3 Drawing Sheets

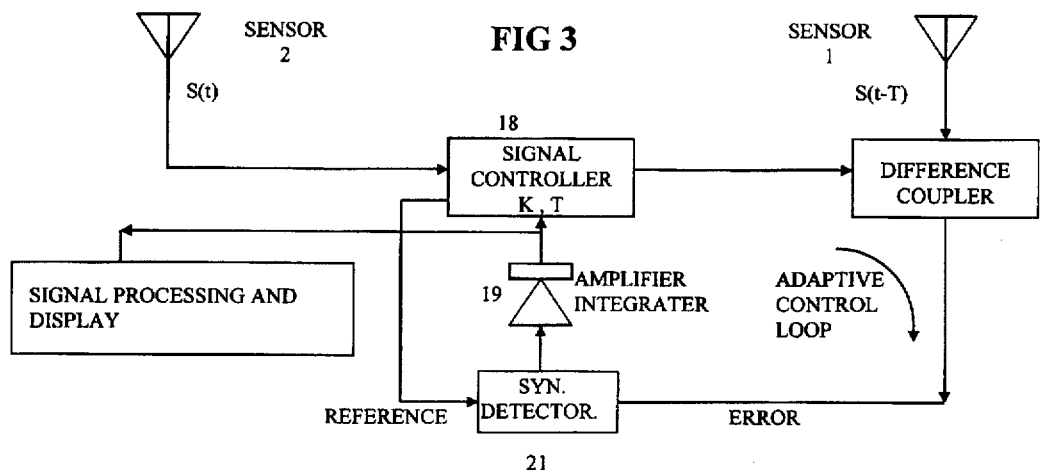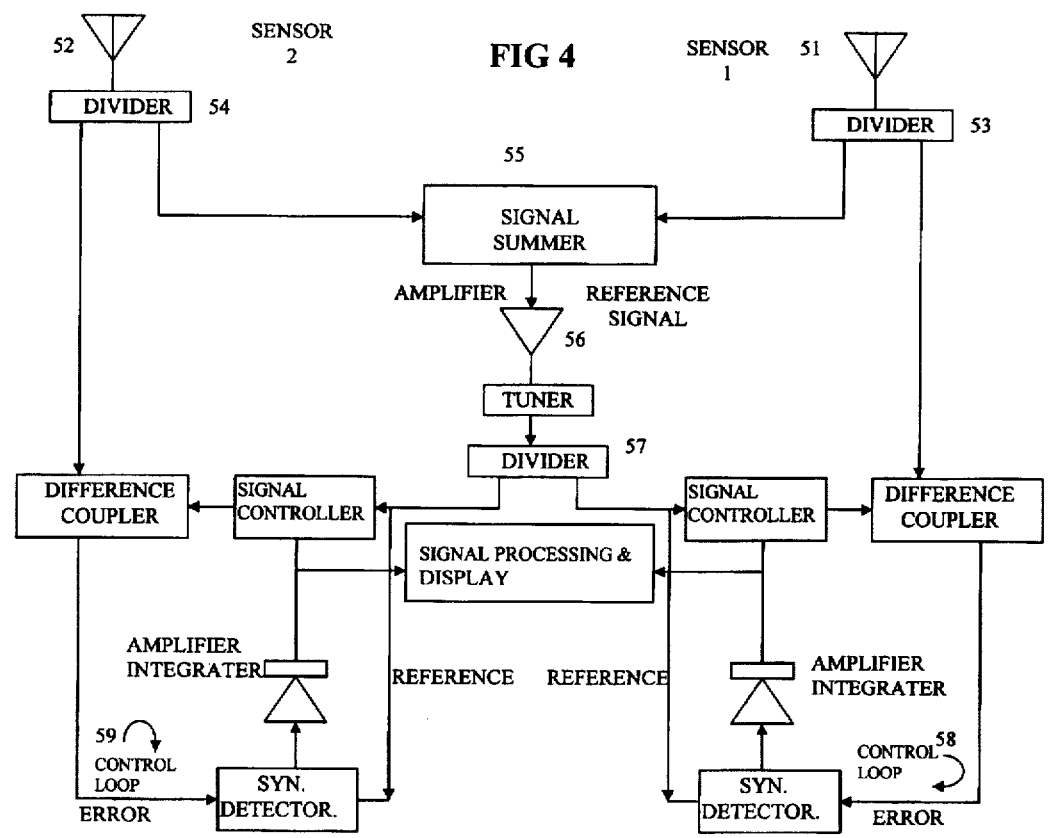

ADAPTIVE DIRECTION FINDING SYSTEM

BACKGROUND OF INVENTION

1Field of the Invention

This invention is in the field of automatic direction finding for an electromagnetic or acoustic signal source when the characteristics of the signal, such as its operating frequency, signal strength, etc., are not a priori known.

2Related Art

Of the many techniques known for the measurement of angle-of-arrival of a signal from a distant emitter, the interferometric technique, when properly implemented, seems to offer the most measurement accuracy potential. Often the determination of angle by the interferometric technique, however, is impaired in the presence of multiple signals in the same geographical area, and in the same frequency band, unless the signal from a particular emitter can be singled out prior to the angle measurement. The determination of angle-of-arrival by interferometric means also becomes difficult when the emitter radiates a broadband or pseudo noise-like signal, since it is difficult to interpret and measure the phase difference for signals received by two sensors which contain the information on the "angle-of-arrival" of the emitter-signal.

The concept for "angle-of-arrival" measurement by an interferometer, consisting of two sensors separated by a baseline, is well known. Since the phases of a signal originating from the same emitter and arriving at two adjacent sensors are not the same unless the signal arrives from the boresight direction, that is, from the direction normal to the baseline between the sensors at its midpoint, the phase difference between the signals received at the two sensors, yields a direct measure of the angle-of-arrival of the signal. Several factors, however, deter this angle measurement including the following:

Resolution and accuracy limitation of phase difference measuring approach and available components such as phase detectors, etc.

Presence of multipaths.

Presence of noise within signal bandwidth, particularly when the signal of interest has a spread spectrum.

Lack of knowledge of the exact frequency of the signal to convert the signal phase difference as measured from the two sensors to the physical angle-of-arrival of the signal.

Presence of multiple signals within the reception bandwidth of the interferometer.

Limitation on available baseline length, and mutual couplings between sensors.

Often these factors are so overwhelming that the angle-of-arrival measurement, by an interferometer requiring a fraction of a degree resolution and accuracy, becomes impossible.

Many approaches have been used in the past to overcome some of the problems relating to the use of the interferometer. For example, a long baseline has been used to reduce the effect of noise during the measurement without affecting the signal. A long baseline, however, is not always available. Even when a long baseline is available, it may not always be desirable as it tends to decorrelate the signal received at the two sensors, particularly when there are local scatterers in the vicinity of the sensors which affect the reception of the signal by the two sensors differently.

The bias error associated with most phase detectors affects the resolution and accuracy of phase-difference measurements and, hence, the resolution of angle-of-arrival measurement. This problem is further aggravated when the signal level or the signal-to-noise ratio, or both, are low.

In prior art known to the applicant, a significant improvement on angle measurement is effected when a nulling technique, invented by Ghose, et al, in U.S. Pat. No. 4,486,757, is used involving automatic cancellation of the signal received by one sensor by the same signal received by the other sensor with an appropriate adjustment of amplitude and phase of the second signal, as required for the cancellation. Since the signals received by the two sensors from the same source differ by some amplitude and some phase, the phase adjustment of the signal received by one sensor to cancel that received by the other is the same as the phase difference of the two signals, the phase in turn being a measure of the angle-of-arrival of the signals. The art of adaptive cancellation of an arbitrary signal or interference is found in U.S. Pat. No. 3,669,444 invented by Ghose et al. This approach avoids the bias error and drift associated with the phase detector. Also, if the reduction of signal received by the first sensor by this nulling technique is 60 dB for example, which is not uncommon for such techniques, the accuracy potential for the phase difference measurement becomes $10^{-3}$ radian, and for a 1 wavelength baseline, this corresponds to ⅙ of a milliradian accuracy in the measurement of the angle-of-arrival of the signal. Furthermore, the ability of the automatic signal cancellation method to maintain a 60 dB null is an indication that the angular resolution obtainable by the technique could also be on the order of ⅙ of the milliradian. It should be noted now that the requirement of a baseline only 1 wavelength long may be a modest requirement, even on a small platform, particularly when the emitter signal of interest is at VHF or higher frequency bands. Thus the adaptive signal nulling approach to measure effective electrical phase difference substantially improves the angle measurement accuracy by the interferometric technique circumventing many of the obstacles that impair the angle measurement as discussed above.

Perhaps the most severe obstacles that still remain while accurately measuring the angle-of-arrival of the emitter signal by an adaptive interferometer are the expected low emitter signal levels or low emitter signal-to-noise ratio, and the presence of multiple signals similar to that of the emitter of interest.

Very often the received signal, the angle-of-arrival of which is to be measured, is at a low level and a high gain receiving antenna or sensor may not be available. Also, the adaptive cancellation devices, as in the Ghose et al invention, cause a loss of throughline signal amounting to 6-10 dB. If the emitter signal levels at the two sensors are about the same, as is usually the case, the signal to be canceled has to be attenuated by the same amount as the throughline loss in the canceling device where amplitude and phase adjustments are made, since the two signals that cancel each other must be at the same level. Thus, if the emitter signal level is low to begin with and no high-gain antenna can be used, an additional attenuation of 6-10 dB may be prohibitive in many cases to use such attenuating means. Furthermore, no amplification of signal received at any sensor is permissible, since the amplifier may introduce uncertain phase errors affecting the accuracy of the angle measurement.

The problem of having no a priori knowledge of the emitter signal frequency is overcome in this invention by a time-domain cancellation technique where an adaptive cancellation of signal received by one sensor by that received by the other sensor is effected by adjusting automatically the amplitude and time delay, instead of the phase delay. The effect of the presence of multiple signals in the present invention is avoided by singling out the particular signal of interest by tuning which has not been permissible in prior art. Additionally, the problem of low level of received signal is avoided in the present invention by an amplification means, also not permissible in any prior art of direction finding by an interferometric technique.

The present invention, therefore, is highly distinguishable from the abovecited references since it overcomes many of the problems and disadvantages of the inventions in prior arts that have substantially limited the range of applications and usefulness of the direction finding system.

One objective of the invention is to provide means for finding the direction of arrival of a narrowband, broadband or pseudo noise-like signal when the frequency or waveform of the signal is not known. Another objective of the invention is to find the direction of arrival of a particular signal, selected from many similar signals simultaneously present at the receiving sensors by tuning such a signal without affecting the relative phase difference between those signals as received by two adjacent sensors. Another objective of the invention is to provide a direction finding means of a low level signal by an amplification that does not affect said relative phase difference, that relates to the angle-of-arrival.

The abovesaid advantages and other differences between this invention and any related prior arts will be further apparent from the specifications, drawings and claims that follow.

BRIEF STATEMENT OF THE INVENTION

The applicant has devised automatic direction finding methods and devices that do not depend on the frequency and bandwidth of the measured signal and do not require a long baseline. Also, unlike conventional interferometric methods for direction finding, the methods and devices involved in this invention permit the determination of the angle-of-arrival of low level signals and signals immersed in an environment containing signals of similar but unknown frequencies, amplitudes and waveforms.

In its simplest form, the invention comprises two separated sensors capable of receiving a signal of distant source or origin, the phase difference between the same signals as received by the two sensors being a measure of the angle-of-arrival of the signals or the direction of the source of the signal. The signals from the two sensors are first summed and amplified to create a reference signal source. This reference signal source is then tuned to the frequency of the signal of interest. When such a tuned signal is used as a reference signal to cancel the signals received in each sensor line by two adaptive cancellation loops, one can determine the relative phase of the signal in each sensor line with respect to the phase of the reference signal from the adjustment of phase of this reference signal needed in each loop to cancel the signal received in each sensor line. Finally, the phase difference between the received signals at the two sensors, as needed to determine the angle-of-arrival of the signals, is obtained by subtracting the phases of the signals in sensor lines with respect to the phase of the reference signal, since by this subtraction process the phase of the reference signal is cancelled out leaving only the phase difference between the signals received by the two sensors as residues following the signal cancellations. Now, since the reference signal phase is cancelled out following the signal subtraction noted above, any phase error introduced at the reference signal due to amplification or tuning does not affect the determination of the angle-of-arrival. One is thus able to determine the true phase difference between the signals received by the two sensors even when the signal level is low and there are interfering signals along with the signal of interest.

One of the serious problems often encountered in direction finding is multipath propagations where the signal from the same emitter arrives at the point of observation through more than one path. In one embodiment of the invention, the signals in undesired multipaths are first cancelled out by using adaptive cancellation loops and the direction of arrival of the signal is measured following the cancellation of such unwanted signals.

BRIEF DESCRIPTION OF THE DRAWINGS

In FIG. 1, the combination of 90° hybrid and two amplitude controls, having values $K_1$ and $K_2$, cause the adjustments of any arbitrary phase and amplitude. The concept of adaptive controls for amplitude and phase adjustments necessary for signal-nulling is also a prior art (U.S. Pat. No. 3,669,444).

FIG. 3 is an illustration of the time-domain adaptive interferometer concept.

FIG. 4 is an illustration of the basic concept of angle-of-arrival determination for weak signals and for signals in the presence of multiple co-channel and adjacent channel interferences. Here the same signals received by the two sensors are summed to create a reference signal which is then used to determine the relative phase of the signal received by each sensor with respect to the reference signal by a means similar to that shown in FIG. 1.

Figure 2:
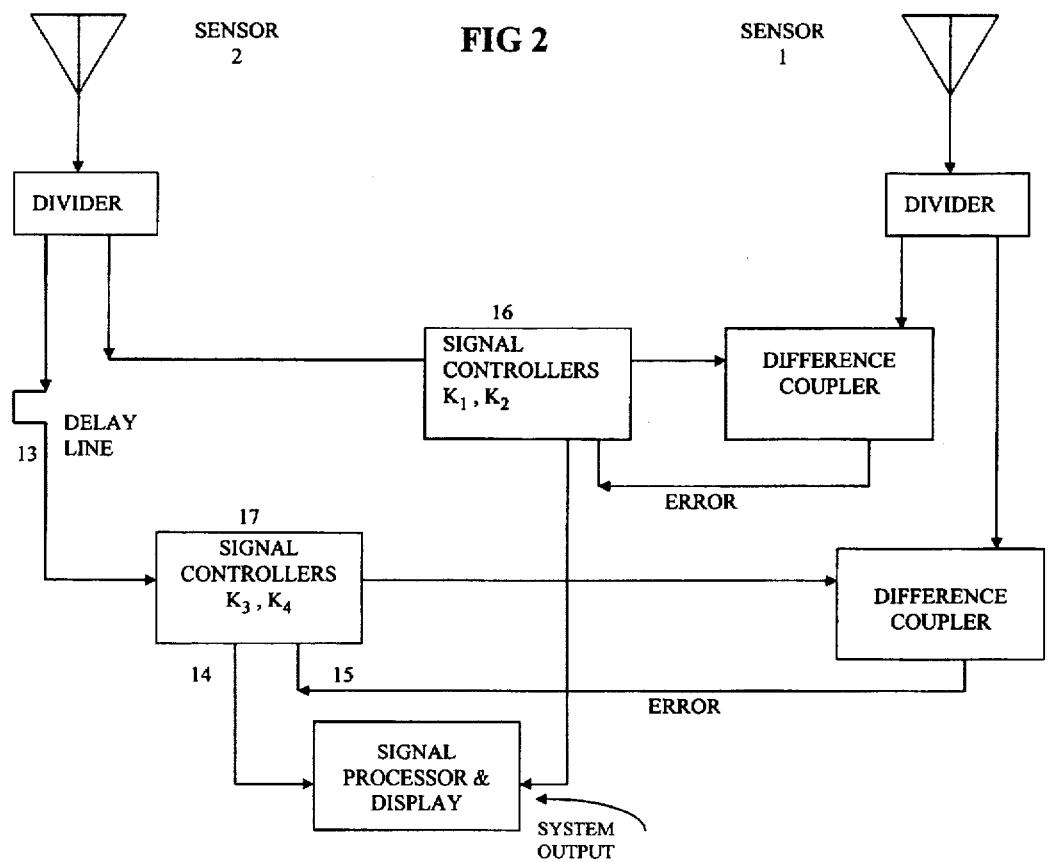
FIG. 2 is an illustration of the concept of determining the angle-of-arrival and frequency of the signal of interest simultaneously by two closed-loop controls.
Figure 5:
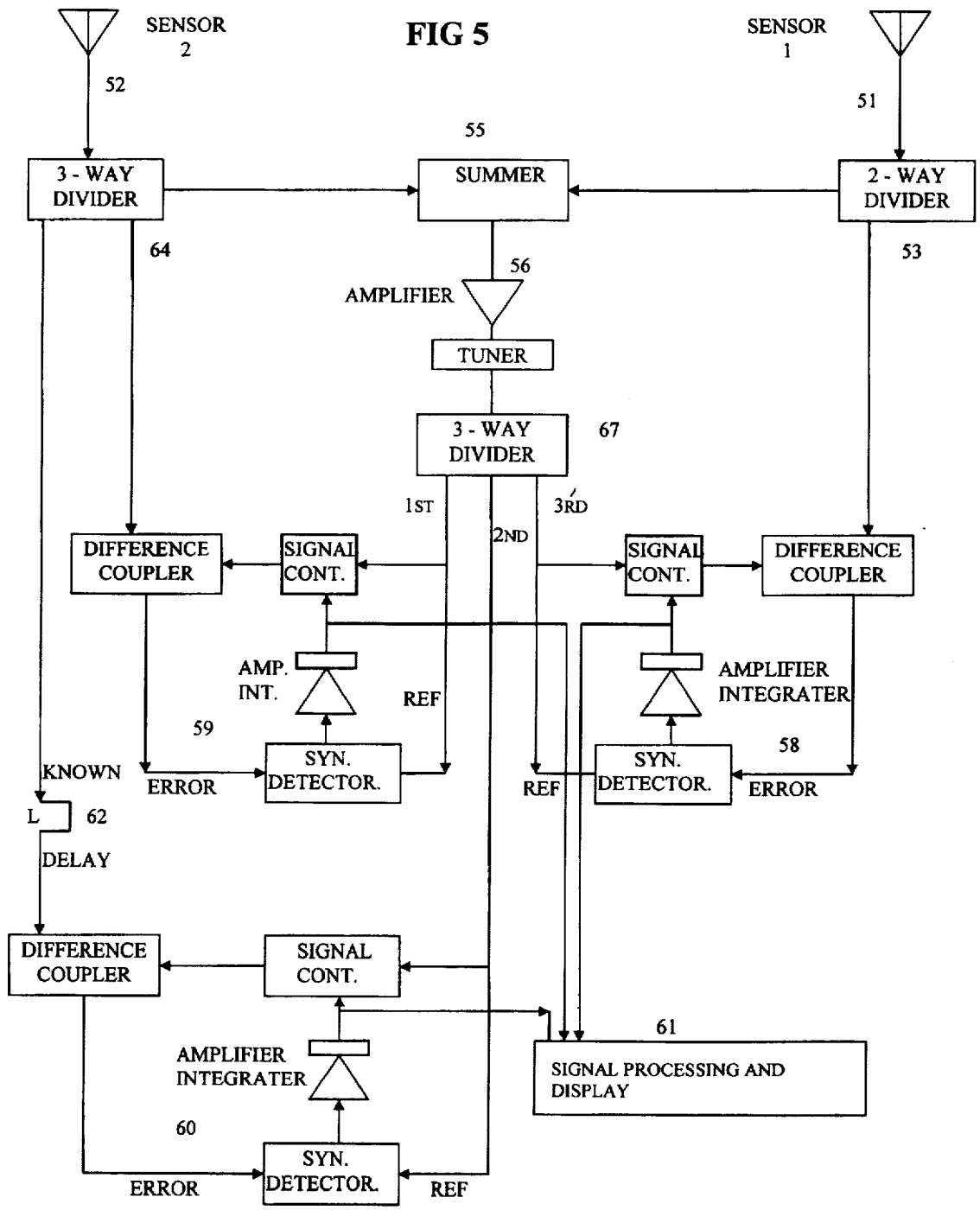

An additional closed-loop control of the reference signal through a fixed delay line to determine the frequency of the signal of interest, similar to that shown in FIG. 2, can also be used if needed. Such an arrangement is illustrated in FIG. 5. Here the phase information obtained by the two loops, 58 and 59, provide the angle-of arrival information as in FIG. 4, while the phase information obtained by loops 59 and 60 provide the information on the wavelength or frequency of the signal under consideration.

DESCRIPTION OF THE INVENTION

Figure 1:
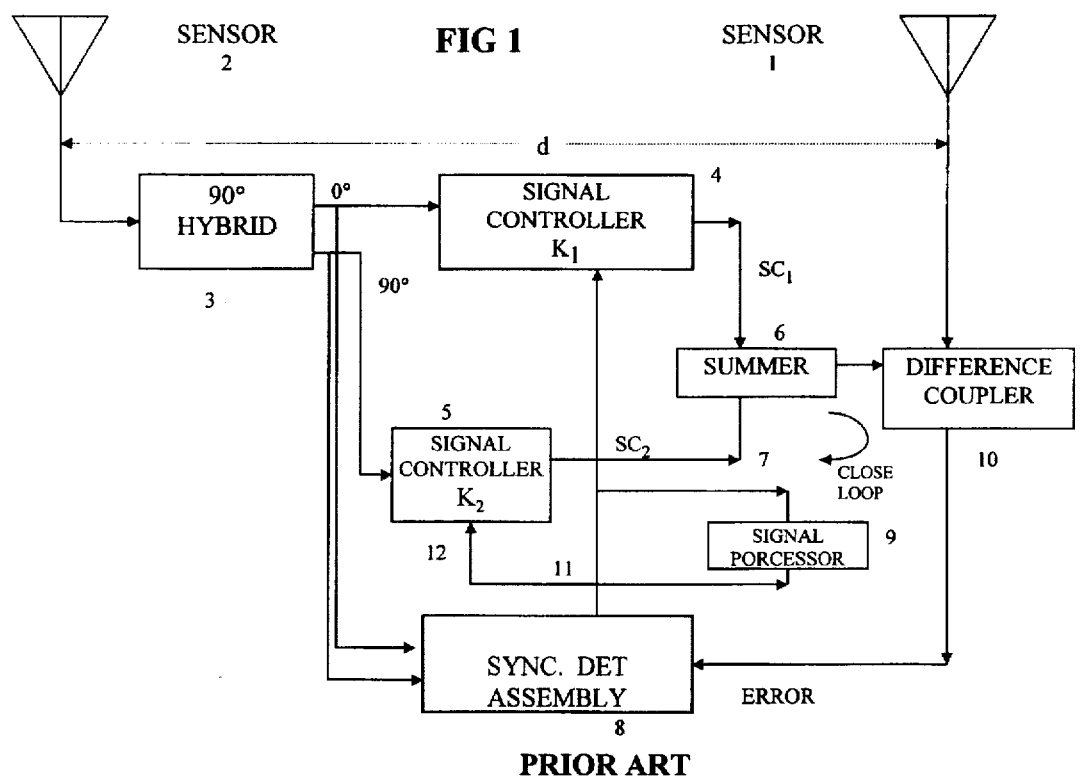
FIG. 1 is an illustration of the basic concept of angle-of-arrival determination by an interferometric technique employing an adaptive closed-loop cancellation approach. This concept may be regarded as a prior art (U.S. Pat. No. 4,486,757). Since for cancellation of the signal received by Sensor 1 in FIG. 1, the Sensor 2 received signal needs to be adjusted in amplitude and phase until the adjusted amplitude and phase become the same as those of the Sensor 1 signal, the amount of phase adjustment is the same as the phase difference between the signals received by Sensors 1 and 2.

The essential problems of determining the angle of arrival of an emitter signal with an adaptive interferometer and a short baseline can perhaps be best described with FIG. 1. Let it be assumed that a distant emitter signal is received by two sensors, 1 and 2. For a monochromatic signal, one may write the signal received by the two sensors as:

$$S_1 = A_1 \sin(\omega t - \phi)$$

$$S_2 = A_2 \sin(\omega t - \phi + 2[\pi/\lambda]d \sin\theta) \qquad (1)$$

where $A_1$ and $A_2$ denote signal amplitudes, $\omega$ is the angular frequency of the emitter signal being equal to $2\pi f$ where f is the frequency of the signal, t is time, $\lambda$ is the wavelength of the signal, $\phi$ is an arbitrary phase and $\theta$ and d are respectively the "angle-of-arrival" of the signal and the separation distance between the sensors 1 and 2.

In the adaptive interferometer, the signal $S_2$, which is the output of the Sensor 2, is led to a 90° hybrid 3, having 0° phase and 90° phase outputs. Signal controllers 4 and 5 provide attenuations $K_1$ and $K_2$ at the 0° and 90° outputs, respectively, such that the output 6 of the signal controller 4 is:

$$S_{c1} = A_2 K_1 \sin\left(\omega t - \phi + \frac{2\pi d}{\lambda} \sin\theta\right) \quad (2)$$

Similarly, because of the 90° phase difference, the output 7 of the signal controller 5 is:

$$S_{c2} = A_2 K_2 \sin\left(\omega t - \phi + \frac{2\pi d}{\lambda} \sin\theta + \pi/2\right) \quad (3)$$

$$= A_2 K_2 \cos\left(\omega t - \phi + \frac{2\pi d}{\lambda} \sin\theta\right)$$

If the two signal controller output signals 6 and 7 are first summed and then this sum is subtracted from $S_1$, the residue signal $S_e$, following the subtraction, which will be referred to as the error signal, can be written as:

$$S_e = S_1 - (S_{c1} + S_{c2}) \quad (4)$$

$$= A_1 \sin(\omega t - \phi) -$$

$$A_2 \sqrt{K_1^2 + K_2^2} \sin\left(\omega t - \phi + \left[\frac{2\pi d}{\lambda} \sin\theta\right] + \psi\right)$$

where $$\psi = \tan^{-1} K_2/K_1$$

If, now, the values of $K_1$ and $K_2$ are so adjusted that:

$$A_1 = \sqrt{K_1^2 + K_2^2}\, A_2 \quad (5)$$

and $$\frac{2\pi d}{\lambda} \sin\theta + \psi = 0$$

the error signal $S_e$ will approach zero.

In an adaptive interferometer, the values $K_1$ and $K_2$ are automatically adjusted so that $S_e$ is driven to a zero value by two closed-loop controls. If for any reason the values of $K_1$ or $K_2$ or both are not exactly what is needed for a null, the nonzero $S_e$ will be placed at the input of a synchronous detector 8 referenced to the signal $S_2$. The characteristic of this synchronous detector is such that there will be a dc output of the detector as long as there is any nonzero input signal having the same waveform as that of the reference signal. Since, in this case, the reference signal has the same waveform as the input signal, there will be dc signals at the output of the synchronous detector whenever $S_e$ is nonzero. These dc signals are used to adjust the values of $K_1$ and $K_2$ through controls 11 and 12 until these values make $S_e=0$. Thus, the closed-loop controls in the adaptive interferometer shown in FIG. 1 will always create a null of the error signal for which:

$$\frac{2\pi d}{\lambda} \sin\theta = -\tan^{-1}\frac{K_2}{K_1} \quad (6)$$

That is, if $d/\lambda \leq 1$, $$\theta = \sin^{-1}\left[-\frac{\lambda}{2\pi d} \tan^{-1}\frac{K_2}{K_1}\right] \quad (7)$$

Eq. (7) shows how the angle-of-arrival $\theta$ of the emitter signal can be determined when $K_2$, $K_1$, d and $\lambda$ are known. The signal processor 9 provides the value of $\theta$ in accordance with Eq. (7).

To avoid an ambiguity, the baseline d must be short, that is $d/\lambda \leq 1$. However, a short baseline causes the resolution problem during the angle measurement, particularly for small values of $\theta$. Thus, from Eq. (6):

$$\frac{K_2}{K_1} = \tan\left(-\frac{2\pi d}{\lambda} \sin\theta\right) \quad (8)$$

and when $\theta$ is very small, $\sin\theta \cong \theta$ and $$\frac{K_2}{K_1} = \tan\left[-\frac{2\pi d}{\lambda} \theta\right] \approx -\frac{2\pi d}{\lambda} \theta \quad (9)$$

The resolution and accuracy with which $\theta$ can be determined by an adaptive interferometer, then, will depend on the resolution and accuracy with which the ratio $(K_2/K_1)$ can be measured. If the control loops are such that one can obtain a 60 dB null initially and maintain a 60 dB, then the resolution and accuracy of $\theta$ will be on the order of $10^{-3}/2\pi$, or about 1/6 of a milliradian when $d/\lambda=1$.

The next problem for the determination of the angle-of-arrival of the emitter signal is the lack of knowledge of the emitter signal frequency. Normally this can be remedied by an additional loop as shown in FIG. 2. Here the first cancellation loop 16 involving signal controllers $K_1$ and $K_2$ is the same as shown in FIG. 1. The second cancellation loop 17, containing a delay line 13 of length L and the 2 additional signal controllers 14 and 15 providing attenuations of $K_3$ and $K_4$, respectively, also creates a null for the signal received by Sensor 1. For the equilibrium condition for both loops, one obtains:

$$\frac{2\pi d}{\lambda} \sin\theta = -\tan^{-1}\frac{K_2}{K_1} \quad (10)$$

$$\frac{2\pi d}{\lambda} \sin\theta - \frac{2\pi L}{\lambda} = -\tan^{-1}\frac{K_4}{K_3}$$

$$\tan^{-1}\frac{K_4}{K_3} - \tan^{-1}\frac{K_2}{K_1} = \frac{2\pi L}{\lambda}$$

or $$\lambda = \frac{2\pi L}{\tan^{-1}\frac{K_4}{K_3} - \tan^{-1}\frac{K_2}{K_1}} \quad (11)$$

Thus, with the knowledge of the signal controller values $K_1$, $K_2$, $K_3$ and $K_4$ and those of the parameters d and L, one can determine the angle of arrival $\theta$ and the wavelength $\lambda$ of the emitter signal. The signal processor and display unit which is at the output of the system in this case, provides information on the angle-of arrival, theta, and the wavelength, lamda, and their display.

The provision of an additional loop to determine the emitter signal frequency, however, does not make the adaptive interferometer operation independent of frequency. More specifically, when the emitter signal is a carrier suppressed, or a broadband signal or a pseudo noise modulated signal, there is no specific value of $\lambda$ for the signal and, hence, an adequate null may not be obtainable by adjusting the amplitude and phase of the signal received by one sensor and subtracting this adjusted signal from that received by the other sensor, as described above. For such a case, a time domain interferometer, where the signal controllers provide an amplitude and a time delay adjustment, instead of a phase adjustment, will be necessary. Since, in the absence of multipaths, the emitter signal, as received by the two sensors, must differ only by an amplitude factor and a time delay, regardless of the complexity of its frequency spectrum of the emitter signal, a time domain adaptive interferometer will make the angle measurement independent of the frequency spectrum of the emitter signal. Such an interferometer also avoids the problem of phase ambiguity when the baseline is more than a wavelength. This advantage, however, may not be relevant when a long baseline is not practical for other reasons. Also, no separate frequency determination is necessary since the angle of arrival θ is dependent only on the differential time of arrival, regardless of the frequency spectrum of the emitter signal.

FIG. 3 shows a schematic arrangement for a time-domain interferometer. In this case, the emitter signal received by the two sensors 1 and 2 is of the form KS(t−T) and S(t). That is, in the absence of a multipath, the emitter signal, regardless of its frequency, modulation, etc., as received by the two sensors, can only differ by an amplitude factor K and a time delay T. For a null, the signal S(t) has to be modified in amplitude by a factor K and delayed by a time delay T. When the signal KS(t−T) is cancelled by an adaptive closed-loop control containing the signal controller 18, the adjustment of time delay T will be a measure of the angle-of-arrival of the signal. Thus, the angle-of-arrival of the signal, in that case, may be obtained from the relation:

$$\theta = \sin^{-1}[c\, T/d] \quad (12)$$

where c is the velocity of propagation of the emitter signal and d is the baseline length. The angle determination by a time domain adaptive interferometer, shown schematically in FIG. 3, then, is independent of frequency since no frequency or modulation related term appears in Eq. (12). The values of K and T needed to create a signal null is processed in accordance with Eq. (12) to obtain the value of θ or the angle-of-arrival of the signal at the signal processor and display unit which also may provide a display of the value of the angle-of-arrival. The synchronous detector 20 and the control for the variable amplitude and time delay 19 are similar to those shown in FIG. 1.

Perhaps the most severe limitations on the measurement of angles from a distant emitter by an interferometer result from the low signal level of the emitter signal and due to the presence of multiple signals at the sensors. To illustrate these problems, one may consider Eq. (5), where the signal controller parameters $K_1$ and $K_2$ are always of fractional values. Since the amplitudes, $A_1$ and $A_2$, of the emitter signal at the sensors are about the same, the signal amplitude $A_1$ has to be reduced by about 6–10 dB for the equality requirement in Eq. (5). Now if the signal level of the emitter is low to begin with, a further reduction of the signal and, hence, the signal-to-noise ratio, may cause the interferometer to be ineffective. Unfortunately, as said earlier, the amplification of the signal at the signal controller path, or amplifications of both signals received by the two sensors, are not permissible because of the inherent nonphase tracking characteristics of the amplifiers. Any phase error or time delay of the signal at the signal controller path, or any differential phase or time delay error when both sensor signals are amplified, causes a direct error in angle measurement by an interferometer.

The angle measurement problem arising from the presence of multiple signals at the sensors can be avoided if a signal selectivity is provided at the sensors. Such a selectivity is readily obtained by a tuned circuit at each sensor. However, the differential phase or time delay introduced by two separate tuned circuits is unacceptable, since it introduces a direct error in angle measurement. Also, a selectivity by tuned circuit is not feasible for co-channel interferences in the form of multipath signals.

FIG. 4 is a simplified illustration of direction finding for weak signals and for signals in the presence of interferences. Here the same signals received by the two sensors 51 and 52 are led to the two power dividers 53 and 54. The output in one branch of the power dividers 53 and 54 are summed in the summer 55 to create a reference signal. This reference signal is then amplified by amplifier 56 and tuned if necessary. The reference signal then is split into two parts at the power divider 57. One of the two output ports of the power divider 57 provides the reference signal for the control loop 58 which nulls the signal at the second branch of the power divider 53 by a means similar to that shown and explained in FIG. 1. Similarly, the second output port of the power divider 57 provides the reference signal for the control loop 59 which cancels the signal at the second branch of the power divider 54. The adjustment of phase made in control loop 58 is the phase difference between the reference signal and the signal received by sensor 51. Similarly, the adjustment of phase made in control loop 59 is the phase difference between the reference signal and the signal received by sensor 52. Finally, the difference in phase adjustments made in control loops 58 and 59 gives the phase difference between the signals received by sensors 51 and 52. Thus, any phase introduced at the reference line, including the amplifier or tuned circuit, does not affect the determination of the relative phase between the signals received by sensors 51 and 52. The arrangement shown in FIG. 4 therefore permits amplification and tuning the reference signal to enable direction finding of weak signals and signals in the midst of co-channel and adjacent channel interferences. The signal processor and display unit, which may be regarded as the system output, processes the value of the angle-of-arrival from the difference in phase angles as obtained from the control loops 58 and 59.

If it is intended to determine the angle-of-arrival θ as well as the frequency of the signal f, one may combine the features of FIGS. 2 and 4. Such an arrangement is shown in FIG. 5. It is seen that FIG. 5 is very similar to FIG. 4 except that two 3-way power dividers, 64 and 67 in FIG. 5 replace the 2-way power dividers 54 and 57 respectively, in FIG. 4. Also, a delay line 62 and a third control loop 60 are introduced in FIG. 5. Thus, in FIG. 5 the reference signal is created in three parts. The first and second parts of the reference signal are used to create countersignals that null the signals received by the sensors 51 and 52 and present at the second outputs of the power dividers 53 and 64 through control loops 58 and 59 respectively. The third part of the reference signal from the third output port of the power divider 67 is used to create a countersignal to null the signal at the third output port of the power divider 64 and the delay line L by the control loop 60. Finally, from the adjustments made in control loops 58, 59 and 60, the signal processor 61 computes and displays the frequency and angle-of-arrival of the signal. The remainder of the operation of FIG. 5 is the same as that described in FIG. 4.

In some cases, the determination of the direction of an emitter signal may require the measurement of two orthogonal angles such as θ and φ corresponding to azimuthal and elevation angles. For such cases, at least three sensors, not all being on the same plane, are required. Again, the sum of the signals received by the sensors can be amplified and tuned to the particular frequency of interest to create the reference signal and to determine the electrical phase angle between the reference signal phase and that of the signal received by each sensor. From these measurements, the common phase of the refertence signal can be eliminated to obtain the differential electric phase between signals received by any pair of sensors and to determine therefrom the two orthogonal angles for the emitter.

The above described embodiments, methods, and operational explanations are furnished as illustrations of the principles of the invention and are not intended to define the only embodimentsd possible in accordance with the teachings of the invention. Rather, protection under the United States Patent Law shall be afforded to the invention, as further defined in the claims.

I claim:

1. A direction finding system for a distant radiating-signal-emitter comprising:

(a) a first and a second sensors, separated by a distance, each sensor being capable of sensing said radiated signal;

(b) a first and a second power dividers, each having an input port and first and second output ports, the input port of the first power divider being connected to said first sensor and the input port of the second power divider being connected to said second sensor;

(c) means for combining the signals from the first output ports of said first and second power dividers to create two parts of a reference signal;

(d) means for adjusting the amplitude and phase of one part of said reference signal to create a first countersignal having an amplitude and phase equal to the signal at said second output port of the first power divider and subtracting said countersignal from the signal at said second output port of the first power divider to create a signal null;

(e) means for adjusting the amplitude and phase of the second part of said reference signal to create a second countersignal having amplitude and phase equal to the signal at said second output port of said second power divider and subtracting this second countersignal from the signal at said second output of second power divider to create a signal null; and (f) means responsive to said adjustments in amplitudes and phases to create said first and second countersignals for computing therefrom and displaying the angle indicating the direction of said emitter.

2. A direction finding system for a distant radiating-signal emitter, as in claim 1, wherein the signal is in the form of a radiated electromagnetic signal.

3. A direction finding system for a distant radiating-signal emitter, as in claim 1, wherein said reference signal is amplified before parts of which are used to create said first and second countersignals to null signal at the second output ports of said first and second power dividers.

4. A directional finding system for a distant radiating-signal emitter, as in claim 1, wherein said reference signal is tuned to the desired frequency before parts of which are used to create said first and second countersignals.

5. A direction finding system for a distant radiating-signal emitter, as in claim 1, wherein each means for creating said countersignals from said reference signal is an automatic closed-loop control comprising:

(a) a signal controller capable of adjusting the amplitude and phase of the reference signal flowing therethrough;

(b) a subtracting coupler capable of subtracting each countersignal from the corresponding signal at the second output port of the power divider;

(c) a monitoring coupler to sense the residual signal, as an error signal following the subtraction; and (d) means for effecting the adjustment of amplitude and phase of the countersignal at the said signal controller until said error signal is driven to zero by the automatic closed-loop control.

6. A direction finding system for a distant radiating-signal emitter, as in claim 1, wherein each said means for creating the countersignal comprises an amplitude and a time delay control.

7. A direction finding system for a distant radiating-signal-emitter, as in claim 1, wherein said reference signal is split into three parts by a power divider, two parts of which are used to create countersignals capable of nulling signals received by said first and second sensors and the third part, while flowing through a known delay line, is used to create a third countersignal also capable of nulling the signal received by first sensor further comprising means responsive to adjustments of amplitudes and phases of the three parts of reference signal while creating said three countersignals to compute therefrom and displaying the direction and frequency of said emitter.

8. A direction finding system for a distant radiating-signal-emitter, as in claim 1, comprising:

(a) a plurality of sensors, each separated from the others by a known distance, and capable of sensing said radiated signal, not all sensors being located on the same plane;

(b) an equal number of power dividers as the number of sensors, each having an input port connected to one of said sensors, and a first and a second output ports;

(c) means for combining the signals at said first output ports of said power dividers to create a reference signal;

(d) means for adjusting the amplitude and phase of a part of said reference signal to create a counter signal having an amplitude and phase equal to said radiated signal at said second output port of each said power divider and subtracting the counter signal from the signal at said second output port of each power divider to effect a signal null following said subtraction; and (e) means responsive to such adjustments in amplitudes and phases for computing therefrom and displaying the two orthogonal angles of said signal emitter.

9. A method for finding the direction of a distant radiating-signal-emitter which comprises:

(a) receiving said signal by first and second sensors separated by a distance;

(b) combining the signals received by first and second sensors, amplifying the summed signal and tuning the summed signal so as to reject signals with frequencies outside the frequency band of said radiated signal creating a reference signal thereby;

(c) creating automatically one countersignal having the same amplitude and phase as those of said signal as received by said first sensor by adjusting the amplitude and time delay of a part of said reference signal such that the countersignal, when subtracted from said signal received by first sensor, causes a null of said signal at the first sensor line;

(d) creating automatically a second countersignal having the same amplitude and phase as those of said signal as received by said second sensor by adjusting the amplitude and time-delay of another part of said reference signal such that said second countersignal, when subtracted from said signal received by second sensor, causes a signal null at the second sensor line; and (e) computing and displaying the angle indicating the direction of said radiating signal emitter from the adjustments made at said two parts of reference signal while creating said first and second countersignals and from the known separation distance between the first and second sensors.

* * * * *